United States Patent
Arslan (10) Patent No.: US 10,826,647 B1
(45) Date of Patent: Nov. 3, 2020

(54) SYSTEM, APPARATUS AND METHOD FOR CALCULATING NOMINAL SYMBOL LEVELS FOR WIRELESS COMMUNCATION SEQUENCES

(71) Applicant: Silicon Laboratories Inc., Austin, TX (US)

(72) Inventor: Guner Arslan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/722,568

(22) Filed: Dec. 20, 2019

(51) Int. Cl.
H04L 1/00 (2006.01)

(52) U.S. Cl.
CPC .......... *H04L 1/0036* (2013.01); *H04L 1/0054* (2013.01)

(58) Field of Classification Search
CPC ... H04L 1/0036; H04L 1/0045; H04L 1/0046; H04L 1/0047; H04L 1/0054; H04L 1/0061; H04L 1/0075
See application file for complete search history.

(56) References Cited

U.S. PATENT DOCUMENTS

| 10,623,225 | B2 * | 4/2020 | Cao | H04L 27/2646 |
|---|---|---|---|---|
| 10,637,705 | B1 | 4/2020 | Shattil | |
| 2002/0044221 | A1 | 4/2002 | Okada | |
| 2014/0177855 | A1 | 6/2014 | Polinske et al. | |

OTHER PUBLICATIONS

Silicon Labs, "AN0823: Configuring Peripherals for 8-Bit Devices in Simplicity Studio," Initial Revision: Feb. 2014, Last Revision: Sep. 21, 2017, 12 pages total.
Silicon Labs, "AN0822: Simplicity Studio™ User's Guide," Initial Revision: Feb. 2014, Last Revision: Jun. 2018, 40 pages total.
U.S. Appl. No. 16/722,512, filed Dec. 20, 2019, entitled "Base Spreading Code Determination for a Wireless Communication Protocol," by Guner Arslan.
U.S. Appl. No. 16/722,545, filed Dec. 20, 2019, entitled "System, Apparatus and Method for Automatically Determining Configuration Parameters for Wireless Devices," by Robert Mark Gorday.
U.S. Patent and Trademark Office, Office Action dated Jun. 11, 2020 in U.S. Appl. No. 16/722,512, and Response to Office Action filed Aug. 25, 2020, 19 pages total.

* cited by examiner

*Primary Examiner* — Siu M Lee
(74) *Attorney, Agent, or Firm* — Trop, Pruner & Hu, P.C.

(57) ABSTRACT

In one aspect, a method includes: receiving, in a configurator for a wireless receiver, a plurality of user-defined parameters for configuring the wireless receiver for wireless communication, the user-defined parameters including pulse shaping information of a pulse shaper of a wireless transmitter to be in communication with the wireless receiver and channel filter information of a channel filter of the wireless receiver; generating a plurality of frequency signals based on a corresponding plurality of predetermined bit sequences and at least two of the plurality of user-defined parameters including the pulse shaping information and the channel filter information; setting a first nominal symbol value based at least in part on an oversampling rate for a demodulator of the wireless receiver; and configuring the wireless receiver with the first nominal symbol value to cause the demodulator of the wireless receiver to operate using the first nominal symbol value.

20 Claims, 9 Drawing Sheets

510 — Set KSI 1 to maximum value or scaled maximum value based at least in part on over sampling rate

520 — Scale second and third frequency signals based at least in part on KSI 1 and first frequency signal 525 — Sample scaled third frequency signal at selected phase 530 — Calculate new candidate KSI 3 based on sampled third frequency signal 535 — New candidate KSI 3 greater than current candidate KSI 3 ?

540 — Replace current candidate KSI 3 with new candidate KSI 3

545 — Additional phases ?

550 — Set KSI 3 to current candidate KSI 3

SYSTEM, APPARATUS AND METHOD FOR CALCULATING NOMINAL SYMBOL LEVELS FOR WIRELESS COMMUNCATION SEQUENCES

BACKGROUND

Many different types of wireless communication protocols exist, and can be used in many different contexts. Wireless transmitters and receivers are often formed with one or more integrated circuits (ICs) that can handle multiple communication protocols such as short-range protocols, long-range protocols, etc. And with the growth of internet of things (IoT) devices, wireless capabilities are being adopted into an ever increasing amount of devices. However many of these devices are designed and built by people who have no understanding of wireless communication theory, operation, etc. And thus, there is a need for skilled engineers/technicians to configure ICs for use in particular devices and communication use cases. But this comes at a significant expense, which can be prohibitive for both an IC designer/manufacturer and for end devices' designers/manufacturers, especially for low volume devices.

SUMMARY OF THE INVENTION

In one aspect, a method includes: receiving, in a configurator for a wireless receiver, a plurality of user-defined parameters for configuring the wireless receiver for wireless communication, the user-defined parameters including pulse shaping information of a pulse shaper of a wireless transmitter to be in communication with the wireless receiver and channel filter information of a channel filter of the wireless receiver; generating a plurality of frequency signals based on a corresponding plurality of predetermined bit sequences and at least two of the plurality of user-defined parameters including the pulse shaping information and the channel filter information; setting a first nominal symbol value based at least in part on an oversampling rate for a demodulator of the wireless receiver; and configuring the wireless receiver with the first nominal symbol value to cause the demodulator of the wireless receiver to operate using the first nominal symbol value.

In one embodiment, the method may further include: setting the first nominal symbol value to a predetermined maximum value when a modulation index for the wireless receiver is within a first range; and otherwise setting the first nominal symbol value to a calculated nominal symbol value. The method may further comprise setting a second nominal symbol value based at least in part on a second frequency signal of the plurality of frequency signals, and scaling the second frequency signal by a scaled value, the scaled value based on the first frequency signal and the first nominal symbol value. Setting the second nominal symbol value may include sampling the second frequency signal at a plurality of phases and calculating a candidate second nominal symbol value using the second frequency signal at each of the plurality of phases. The method may further comprise setting the second nominal symbol value to the maximum candidate second nominal symbol value. The method further may include: setting a third nominal symbol value based at least in part on a third frequency signal of the plurality of frequency signals, comprising: sampling the third frequency signal at a plurality of phases and calculating a candidate third nominal symbol value using the third frequency signal at each of the plurality of phases; and setting the third nominal symbol value to the minimum candidate third nominal symbol value.

In an embodiment, the first nominal value is for a first bit sequence having a first predetermined bit pattern, the second nominal symbol value is for a second bit sequence having a second predetermined bit pattern and the third nominal symbol value is for a third bit sequence having a third predetermined bit pattern. Configuring the wireless receiver may include communicating the first nominal symbol value from the configurator to a non-volatile storage of the wireless receiver for storage in the non-volatile storage.

In another aspect, a non-transitory storage medium may store instructions that when executed enable a hardware configurator to perform a method in accordance with the above discussion.

In another aspect, an apparatus includes: a radio frequency (RF) front end circuit to receive and process an RF signal having a plurality of symbols including symbol data; a mixer to downconvert the RF signal to a second frequency signal having the plurality of symbols including the symbol data; a digitizer to digitize the second frequency signal having the plurality of symbols including the symbol data; a symbol buffer to store the symbol data from the plurality of symbols; and a cost function engine coupled to the symbol buffer.

In an embodiment, the cost function engine may include: a storage to store a plurality of nominal symbol values each associated with a predetermined bit pattern, where the plurality of nominal symbol values are populated into the storage from a configuration file, the configuration file generated by a hardware configurator in response to one or more user input parameters; a first plurality of registers to receive and pass a sample of the symbol data; a second plurality of registers to receive and pass a selected one of the plurality of nominal symbol values; a comparator circuit to compare the sample of the symbol data to the selected nominal symbol value and to output a comparison result; and an adder to sum the comparison result and to output a sum value.

In an embodiment, the apparatus may further include a Viterbi decoder coupled to the cost function engine, where the Viterbi decoder is to decode the symbol data based at least in part on the sum value. The apparatus further may include a non-volatile memory to store the configuration file. A CORDIC engine may receive the symbol data and store phase-differentiated symbols into the symbol buffer. The plurality of nominal symbol values comprises expected phase difference values. The adder may perform a correlation over a programmable window size.

DETAILED DESCRIPTION

In various embodiments, techniques are provided to enable an unsophisticated user to obtain optimal settings for a wireless device that the user is seeking to employ. More particularly in embodiments the user may provide a limited set of desired operating parameters for a wireless system. From these limited parameters, a configurator device may automatically determine a large amount of configuration settings that can be programmed into wireless devices, including both transmitters and receivers.

Figure 1:
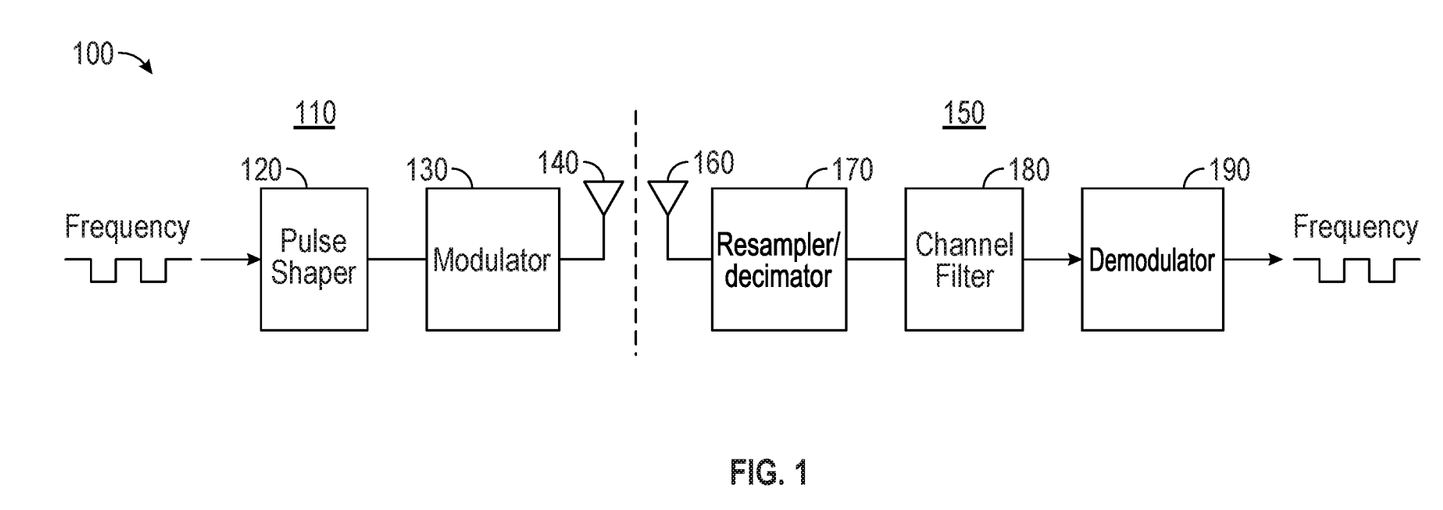
FIG. 1 is a high level view of a wireless communication environment in accordance with an embodiment.

Referring now to FIG. 1, shown is a high level view of a wireless communication environment in accordance with an embodiment. As shown in FIG. 1, wireless environment 100 may be any location in which a wireless transmitter 110 and a wireless receiver 150 are present. In some cases, environment 100 may be within a local area such as a wireless local area network in which wireless transmitter 110 and wireless receiver 150 are closely located to each other, e.g., within approximately 0.0 meters (m) to 50 m. In other cases, environment 100 may be a wireless wide area arrangement in which wireless transmitter 110 and wireless receiver 150 are separated by potentially much greater distances.

In any case, environment 100 is shown with wireless transmitter 110 and wireless receiver 150 to illustrate possible environments in which these devices may communicate. With embodiments herein, one or more of wireless transmitter 110 and wireless receiver 150 may be configured, based at least in part on high level user-provided configuration parameters. Using this information, a configurator device (not shown for ease of illustration in FIG. 1) may automatically determine configuration settings for a great number of components of the devices.

After receipt in the configurator of these limited user-provided parameters, the configurator may perform a number of calculations to develop a set of optimized configuration settings for one or more of wireless transmitter 110 and wireless receiver 150. In turn, the configurator may provide the corresponding configuration settings to a given wireless device for storage in a non-volatile memory of the device. In this way, a user such as an end user who is unsophisticated with regard to the devices themselves (or any other user lacking highly technical or skilled knowledge of wireless communications), may appropriately configure devices to enable desired wireless communications to occur. For example a user may be a so-called maker/designer/builder of devices for which wireless communication capabilities are desired. For example, these devices may be IoT devices of many different types, ranging from security and home automation systems, to drones, toys, or so forth. Instead of having to design wireless communication capabilities and/or hire a skilled engineer to develop settings for use in such systems, the user may generate settings using a configurator as described herein. Then the user may download the settings into the wireless devices themselves (e.g., into a non-volatile storage within an IC). Such ICs may include microcontrollers, systems on chip or other ICs having integrated wireless functionality (e.g., wireless receiver and transmitter, for one or more wireless protocols).

In a particular aspect, this configurator may be used to generate configuration settings relating to nominal symbol levels for certain communication sequences. These nominal symbol levels, also referred to herein as expected phase difference values or Ksi values, may be used in operation within a demodulator to identify incoming sequences, as described further herein. Of course while such settings are one example use case of a configurator, many more use cases are possible.

FIG. 1 includes high level views of transmitter 110 and receiver 150. As shown, wireless transmitter 110 includes a pulse shaper 120, which may be implemented as a pulse shaping filter that receives an incoming information signal and shapes it accordingly. In turn, pulse shaper 120 is coupled to a modulator 130, which modulates the incoming signal. As an example, modulator 130 may be configured as some type of frequency modulator, which may take various forms such as a frequency shift keying (FSK) modulator. In turn, the resulting modulated signal, after up conversion to a radio frequency (RF) signal (via a mixer, not shown in FIG. 1) is transmitted via an antenna 140.

In turn, wireless receiver 150 receives the incoming RF signal via an antenna 160 and provides it, after down conversion to a lower frequency signal such as an intermediate frequency (IF), zero intermediate frequency (ZIF) or baseband signal (e.g., via a mixer not shown in FIG. 1), to a re-sampler/decimator 170, which reduces the sampling rate. The resulting signal is provided to a channel filter 180, which applies appropriate channel filtering. In turn, the filtered signal is provided to a demodulator 190, which demodulates the signal to output a corresponding demodulated signal. Understand that a plurality of demodulation techniques may be used, and a given wireless receiver may include one or more demodulators to be selected for use based on desired operation mode. In some embodiments, demodulator 190 may be implemented as a Viterbi demodulator.

Viterbi demodulator 190 may leverage inter-symbol interference (ISI) from neighboring symbols in its demodulation operations. With this arrangement that opportunistically uses interference that would otherwise be an impediment to efficient operation, embodiments may demodulate incoming symbols with sensitivity improvements of about 3 dB as compared to a discriminator-based demodulator.

However for a Viterbi demodulator to work effectively, the level of ISI should be considered. To this end, a nominal symbol level for selected bit sequences may be predetermined and stored as configuration settings into a wireless receiver so that proper operation may occur. This is so, since this nominal symbol level is determined, at least in part by neighboring symbols in the presence of ISI. Without an embodiment, a highly skilled engineer would be required to determine these settings on a per use case basis, which is prohibitively expensive and prevents an individual or small customer from the ability to optimize settings for a particular receiver use case. This is especially so, as these nominal symbol values vary based on a variety of different parameters for each use case.

Figure 2:
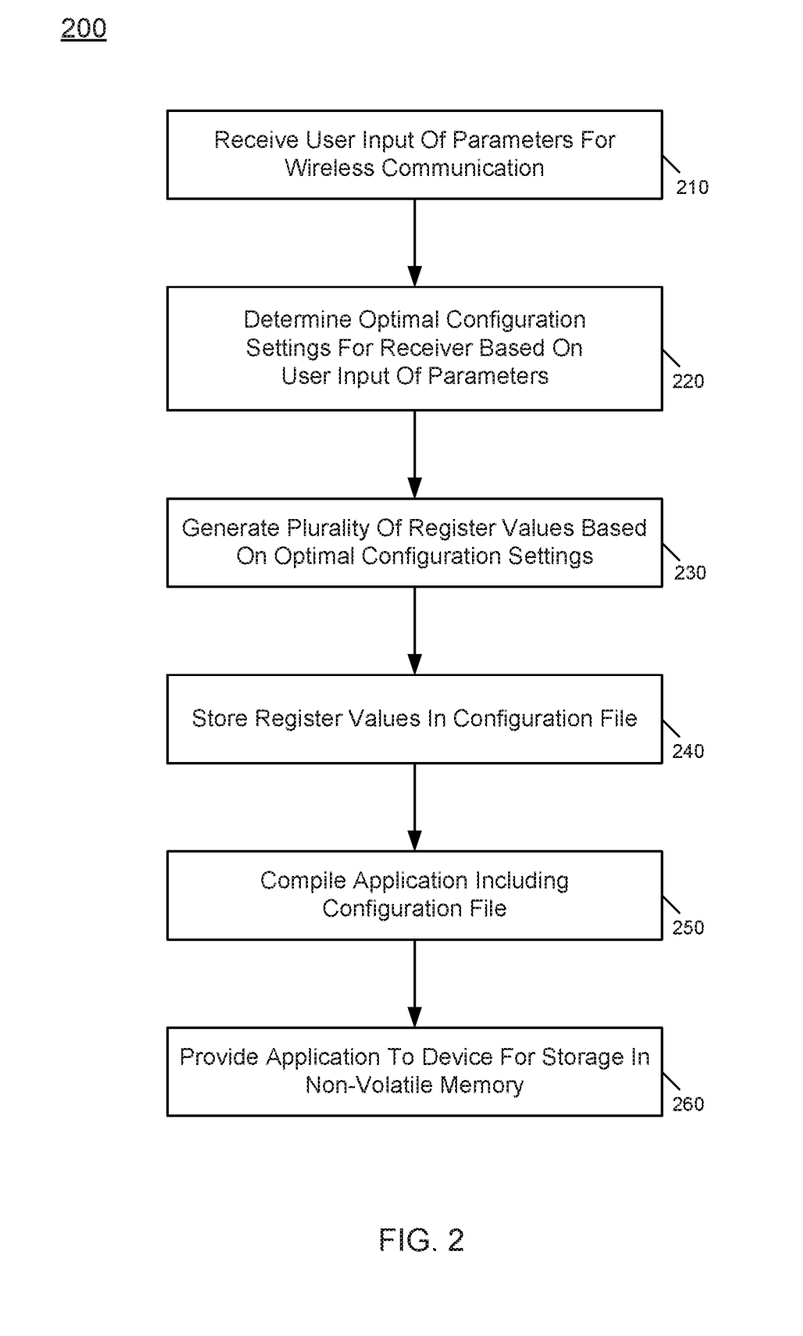
FIG. 2 is a flow diagram of a method in accordance with an embodiment.

Referring now to FIG. 2, shown is a flow diagram of a method in accordance with an embodiment. As shown in FIG. 2, method 200 is a method for configuring optimal configuration settings for a wireless receiver. Method 200 may be performed by a hardware configurator, which may be implemented as hardware circuitry, firmware, software and/or combinations thereof.

Note that the hardware configurator may be executed on a computing platform that executes a program stored in at least one non-transitory storage medium that includes instructions to execute a number of routines to determine configuration settings for a variety of different components of wireless devices, including wireless transmitters and receivers as described herein. In embodiments, a user may access this configurator device using a graphical user interface that seeks user entry of a limited number of configuration parameters for a wireless environment. From there, the configurator device may determine configuration settings and generate a configuration file including these settings and provide them for storage in one or more non-volatile memories associated with the wireless devices themselves.

As illustrated, method 200 begins by receiving user input parameters for desired wireless communication (block 210). For example, a user may be presented with one or more graphical user interfaces through which the user may input a small number of user-defined parameters. For purposes of discussion herein, these parameters may be provided at a very high level. For example, an unsophisticated user may simply provide information regarding a wireless environment and desired use case, such as a range of wireless communication between a transmitter and a receiver, power levels, amounts of data, data rates, desired wireless communication protocol, modulation scheme and so forth. Depending upon implementation, only very high level information such as described above may be provided. In other cases, a user may provide some more detailed information, including desired modulation index, transmitter and receiver characteristics, including filtering characteristics, decimation characteristics and so forth.

In any event, control passes from block 210 to block 220 where the configurator may determine optimal configuration settings for (at least) a wireless receiver based on the user input of parameters. Note that these optimal configuration settings may be automatically determined algorithmically based on the high level input provided by the user. To this end, the configurator may include various subroutines that are configured to determine one or more configuration settings for components of the wireless receiver based on the limited user input.

Note that these subroutines may execute in a non-deterministic manner. That is, it does not matter what subroutine is executed in which order. This is so, since each subroutine, during execution, proceeds to a final determination of one or more configuration values, or a determination that the subroutine cannot complete, due to incomplete input information. Then on another iteration of the multiple subroutines, a given subroutine may be able to access all of its inputs, such that it may complete to a final determination of one or more configuration values. Such operation proceeds iteratively until all subroutines complete. And in some embodiments, the subroutines may continue to execute until a complete iteration of the subroutines completes without a single configuration setting changing. This completion thus ensures that most optimal configuration settings are provided for all parameters.

Still referring to FIG. 2, next at block 230 multiple register values may be generated based on the optimal configuration settings. For example, each subroutine may output a final optimal configuration setting (or multiple such settings). In turn, each of these configuration settings may be mapped to a given register within the wireless receiver that is to receive and store the configuration setting(s) for use in receiver operation, as described more fully herein. As further shown, at block 240 these register values may be stored into a configuration file. In addition, the configurator may present the individual configuration settings to the user via another screen of the graphical user interface. In some cases, the configurator may seek user confirmation of one or more of the configuration settings.

Still with reference to FIG. 2, next at block 250 an application may be compiled that includes this configuration file. For example a toy helicopter that is controlled by a wireless MCU has an application running that controls all actions of the helicopter. This application may control the motors, LEDs, rotors and whatever else that is to be controlled. All these controls have nothing to do with the wireless capabilities, which may be used to communicate with the remote control of the toy. So in this case the application that controls the helicopter would be the main application and the modem would be programmed only to send a handful of commands between the remote and the helicopter.

Still with reference to FIG. 2, at block 260 this application may be provided to at least one device, e.g., a given wireless receiver, for storage in a non-volatile memory. At this point, the wireless receiver is appropriately configured for normal operation. Then when the wireless receiver is powered on in the field, it may access this configuration file and provide the configuration settings to the appropriate registers of the wireless receiver for storage and use. Understand while shown at this high level in the embodiment of FIG. 2, many variations and alternatives are possible.

As mentioned above, a nominal symbol level for a given symbol is determined by neighboring symbols if ISI is present. For example assume ISI from immediate neighboring symbols only in a −1 +1 −1 sequence. For this bit sequence, the +1 in the middle of the sequence would be pulled down to yield a lower nominal value, as compared to the middle +1 in a −1 +1 +1 sequence (or a +1 +1 −1 sequence). In turn, this middle +1 value would be lower than the middle +1 in a +1 +1 +1 sequence. Note while these example symbol sizes and bit sequences are used in this example, understand that embodiments may be used to determine nominal symbol levels for many different sizes of symbol length and bit sequences.

To make use of the Viterbi demodulator, nominal levels of each of these cases may be determined and stored as configuration settings. During operation, a demodulator then uses these nominal symbol values to calculate error terms and make decisions using a Viterbi algorithm. These nominal symbol levels may be a function of, among other items, symbol period, deviation, symbol shaping filters, and any filtering on the receive side. Most prominent of these variables are symbol shaping filters of the transmitter and channelization filters of the receiver.

For a standards-based application, e.g., Bluetooth Low Energy (BLE), nominal symbol levels can be determined from simulations since the parameters are fixed for a given standard application. However, to use a Viterbi demodulator for other wireless protocols such as proprietary applications, nominal symbol levels may be determined based on some user-provided configuration parameters and additional modulation parameters determined in the configurator device. Calculating these nominal symbol levels is not trivial as non-linear operations may be performed both on the transmit side and receive side, which complicate the calculations.

Thus one particular set of configuration settings that may be optimized using an embodiment is optimized nominal symbol values. Such values for particular use cases may be automatically determined based at least in part on a small number of user-defined parameters. These optimized nominal symbol values may enable a receiver to operate with better performance in a particular usage environment as compared to a solution that fixes these values during design.

Figure 3:
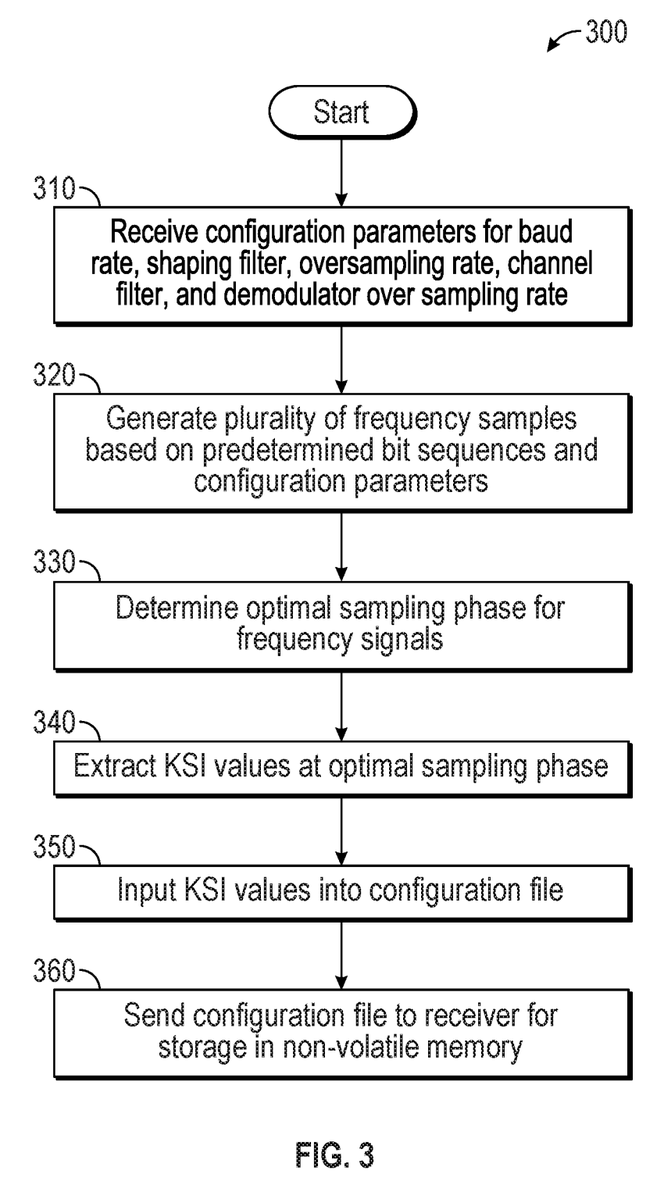
FIG. 3 is a flow diagram of a method in accordance with an embodiment.

Referring now to FIG. 3, shown is a flow diagram of a high-level view of a method for generating values, namely Ksi values or expected phase differences, in a configurator and storing them in a wireless receiver as described herein. Method 300 may be performed by a hardware configurator, which may be implemented as hardware circuitry, firmware, software and/or combinations thereof.

Note that the discussion in FIG. 3 is in the context of wireless transmitters and receivers and components thereof and the generation and processing of signals. However, the operations in FIG. 3 in fact are performed by the configurator device itself, which thus acts as a simulator to generate and process (including filtering, decimating, sampling and so forth) the described frequency signals. These frequency signals thus represent or simulate generation and transmission of RF signals (from a transmitter point of view) and receipt and processing of such RF signals (from a receiver point of view). As such, method 300 represents a complete simulation of a wireless environment based on limited user-provided configuration parameters.

As illustrated, method 300 begins by receiving configuration parameters from a user (block 310). These user-defined parameters may be received via user interaction with a graphical user interface. Via this interface, the user may input a small number of user-defined parameters. Such configuration parameters may include baud rate, shaping filter information, oversampling rate of a channel filter, channel filter information and demodulator oversampling rate. Note that depending on implementation, some of this information may be received directly from the user via the interface, while other types of the information may be generated within the configurator. Also note that while a given transmitter and receiver may include many other components that affect nominal symbol levels, two parameters, namely pulse shaping information of a pulse shaper of a transmitter and channel filter information of a channel filter of a receiver, may be of primary consideration for determining optimal nominal symbol levels. As discussed above, this information may be obtained from a user, such as an inexperienced user, via a graphical user interface. For example, the pulse shaping parameters may generally be received from the user, but the channel filter typically is calculated by the configurator.

Next at block 320, multiple frequency signals may be generated. More specifically, each of these frequency signals may be based on a predetermined bit sequence and at least in part on some of the above-described configuration parameters (namely the pulse shaping information and the channel filter information). Details of one technique for generating frequency signals are described below.

Control next passes to block 330 where an optimal sampling phase may be determined for sampling the frequency signals. This sampling phase may be one of multiple phases based on the oversampling rate of the demodulator. Then at block 340 nominal symbol levels, also called Ksi values, may be extracted at the optimal sampling phase. At this point, appropriate nominal symbol levels have been determined. In addition to presenting these nominal symbol levels to the user via the graphical user interface, these values may be placed into a configuration file (block 350). Note that the Ksi values can be used to determine the threshold to use for a correlator that detects a possible preamble or a sync word. Or if a cost function engine is used instead of a correlator, the cost is calculated based on the Ksi values.

Understand that this configuration file may include many other configuration settings for the wireless receiver. When this configuration file has been fully populated, control passes to block 360 where the configuration file may be sent from the configurator to the receiver. More specifically, the configurator may couple to the wireless receiver, e.g., via a USB or other interface. For example an I$^2$C, SPI, or another any protocol can be used for transmitting data. In some cases, the configuration file may be directly communicated to a wireless device including the receiver. This configuration file can also be updated wirelessly. For example, a wireless device can receive an update over the air and the rewrite its own non-volatile memory with the new data. Once a customer has a specific image, they could image it on their chips at production time or later, with multiple chips being imaged at once in a factory setting. In any event, the receiver may store this configuration file in a non-volatile memory. Thus at this point, the wireless receiver is configured for normal operation.

When the receiver is powered on in a normal operation mode, the receiver may perform a self-test and initialization in which various configuration settings may be stored into appropriate configuration registers associated with different components of the wireless receiver. In this way, a wireless receiver is configured with these values such that when it is enabled for operation in which a Viterbi demodulator is selected for use, these values may be stored into appropriate registers or other storages, and/or used as control signals for use in performing demodulation as described herein. As another example a given receiver may be configured for several modems depending on different modes. It could first load a slower modem and based on communication with the other side decide to switch to a faster modem or the other way around. Each modem could have totally different settings including the Ksi values. While shown at this high level in the embodiment of FIG. 3, many variations and alternatives are possible.

Figure 4:
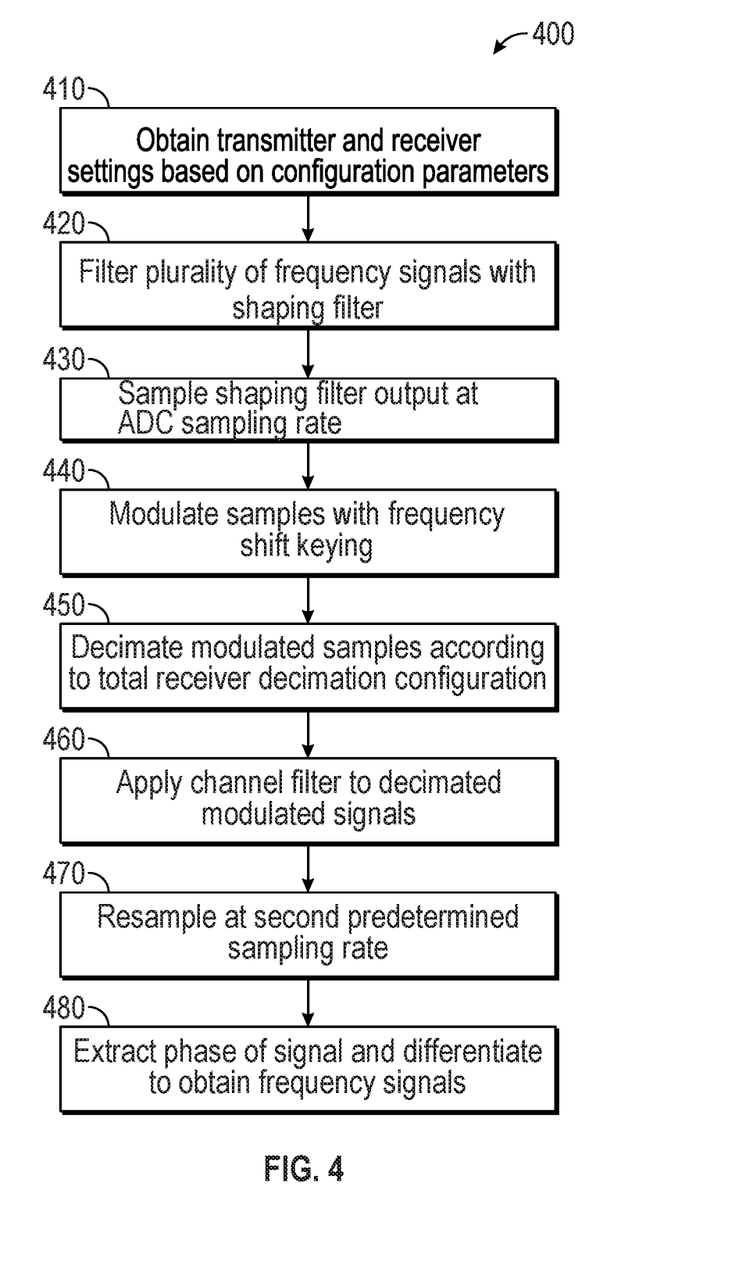
FIG. 4 is a flow diagram of a method in accordance with yet another embodiment.

Referring now to FIG. 4, shown is a flow diagram of a method in accordance with yet another embodiment. More specifically, method 400 of FIG. 4 is a method for generating frequency signals, namely a more detailed flow of frequency signal generation described above at block 320. As such, method 400 may be performed by a hardware configurator, as discussed above.

As illustrated, method 400 begins by obtaining transmitter and receiver settings based on received configuration parameters (block 410). Such settings in an embodiment may include baud rate, frequency deviation, sample rate converter information, decimation information and an oversampling rate. In addition, this user-defined parameter information may include shaping filter information and channel filter information.

Next, control passes to block 420 where multiple frequency signals, each associated with a given bit pattern, may be filtered with a shaping filter. Then at block 430 this shaping filter output may be sampled at a sampling rate of the receiver ADC. Next at block 440 the samples may be modulated, e.g., with frequency shift keying. Thereafter at block 450 the modulated samples may be decimated according to the decimation configuration of the total receiver chain. Control next passes to block 460 where channel filtering of the decimated modulated signals may be performed by application of a channel filter. The resulting signals may be resampled at a second predetermined sampling rate, namely an oversampling rate of the receiver at block 470. Note that while several resamplings are shown, in other embodiments there could be a number of resamplers in the chain. More generally a resampling operation may be performed for any sample rate converter or decimator. Finally, at block 480 phase signals may be extracted and differentiated to obtain frequency signals that correspond to a simulated version of resulting received frequency signals in the wireless receiver.

In another embodiment these frequency signals may be obtained using a streamlined process. In this case, the frequency signals associated with the bit patterns may be filtered by a shaping filter at 8× baud rate (this is so, since in an embodiment a transmitter stores these coefficients at this rate and thus shaping filter coefficients are already available at this sampling rate). Then these filtered samples are modulated and then resampled at the channel filter rate. Next, the decimated modulated signals are channel filtered by applying the channel filter. The resulting signals are resampled at an oversampling rate×baud rate (where the oversampling rate is the desired oversampling rate at the demodulator). Finally, phase signals may be extracted and differentiated to obtain frequency signals that correspond to a simulated version of resulting received frequency signals in the wireless receiver. This streamlined process may be faster since the highest sampling rate is 8× baud rate, which may occur because the effect of the decimation filters are negligible since they are much wider than the channel filter.

In different embodiments a single nominal symbol value may be used. In other cases, to provide higher accuracy, multiple nominal signal levels may be determined and used. In a particular embodiment herein, three such nominal symbol values may be determined and used; however understand that embodiments are not limited in this regard.

Figure 5A:
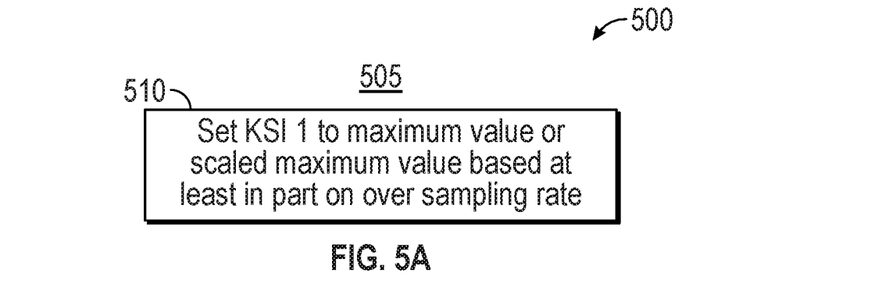
FIG. 5A is a flow diagram of a method for determining a first nominal symbol level in accordance with an embodiment.

Referring now to FIG. 5A, shown is a flow diagram of a method for determining a first nominal symbol level, which may be performed in a hardware configurator. More specifically, method 500 is a method for determining a first Ksi value (Ksi1) that is an expected symbol level for a first bit sequence. As illustrated, at block 510 this first Ksi value is set to a maximum value or a scaled maximum based at least in part on the oversampling rate of the receiver. As one example, this maximum value may be set to 64 for a first bit sequence, namely a sequence of "111000." For this sequence, the expected received value represents a sequence having a pattern that remains constant (i.e., one followed by another one or zero followed by another zero).

Figure 5B:
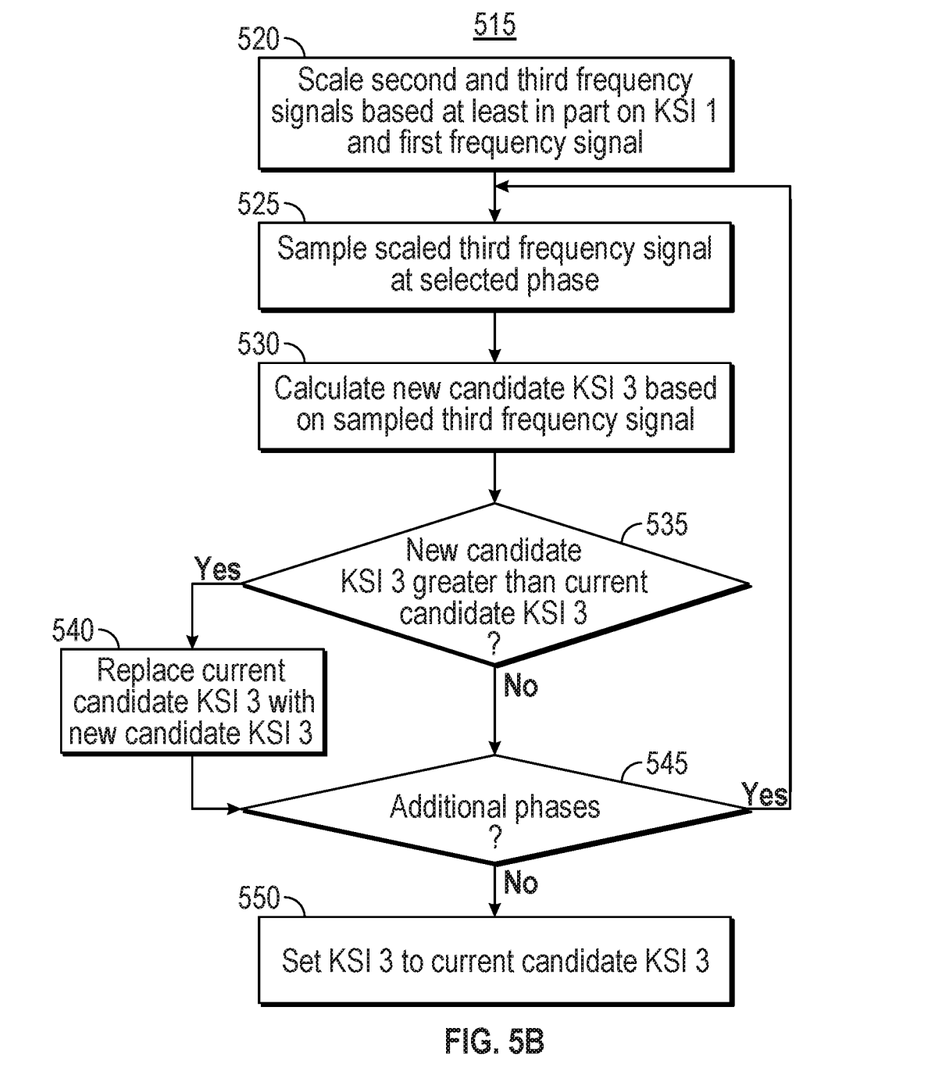
FIG. 5B is a flow diagram a method for determining another nominal symbol level in accordance with an embodiment.

Referring now to FIG. 5B, shown is a flow diagram of a method for determining another nominal symbol level, which may be performed in the hardware configurator. More specifically, method 515 is a method for determining a third Ksi value (Ksi3) that is an expected symbol level for a third bit sequence (namely a sequence of "101010"). As illustrated, method 515 begins by scaling second and third frequency signals based at least in part on the first Ksi value and the first frequency signal (block 520). With a first Ksi value of 64, the second and third frequency signals may be scaled to lower values. Control next passes to block 525 where the scaled third frequency signal may be sampled at multiple phases. Beginning with the first sample phase, at block 530 a new candidate Ksi3 value is calculated based on this sampled frequency signal (of the selected phase). Next it is determined at diamond 535 whether this new candidate Ksi3 value is greater than current candidate Ksi3 value. If so, control passes to block 540 where the current Ksi3 value is replaced with the new candidate Ksi3 value, otherwise it is not. In any case, control next passes to diamond 545 to determine whether there are additional phases to evaluate. If so, control passes back to block 525. Otherwise, at block 550 the Ksi3 value is set to the current candidate Ksi3 value.

Understand while shown with this particular implementation in the embodiment of FIG. 5B, many variations and alternatives are possible. For example, a similar method may be used to determine another nominal symbol level. More specifically, a second Ksi value (Ksi2) that is an expected symbol level for a second bit sequence (namely a sequence of "1010011") may similarly be determined. However, for this Ksi value, a minimum candidate Ksi2 value of one of multiple phases may be selected as the Ksi2 value. That is, if the generated frequency signal were sampled perfectly symmetrically, the same value would be present for both the "110" and "011" sequence. However, with a limited oversampling rate, a lower one of multiple candidate KSi2 values may be selected.

Figure 6:
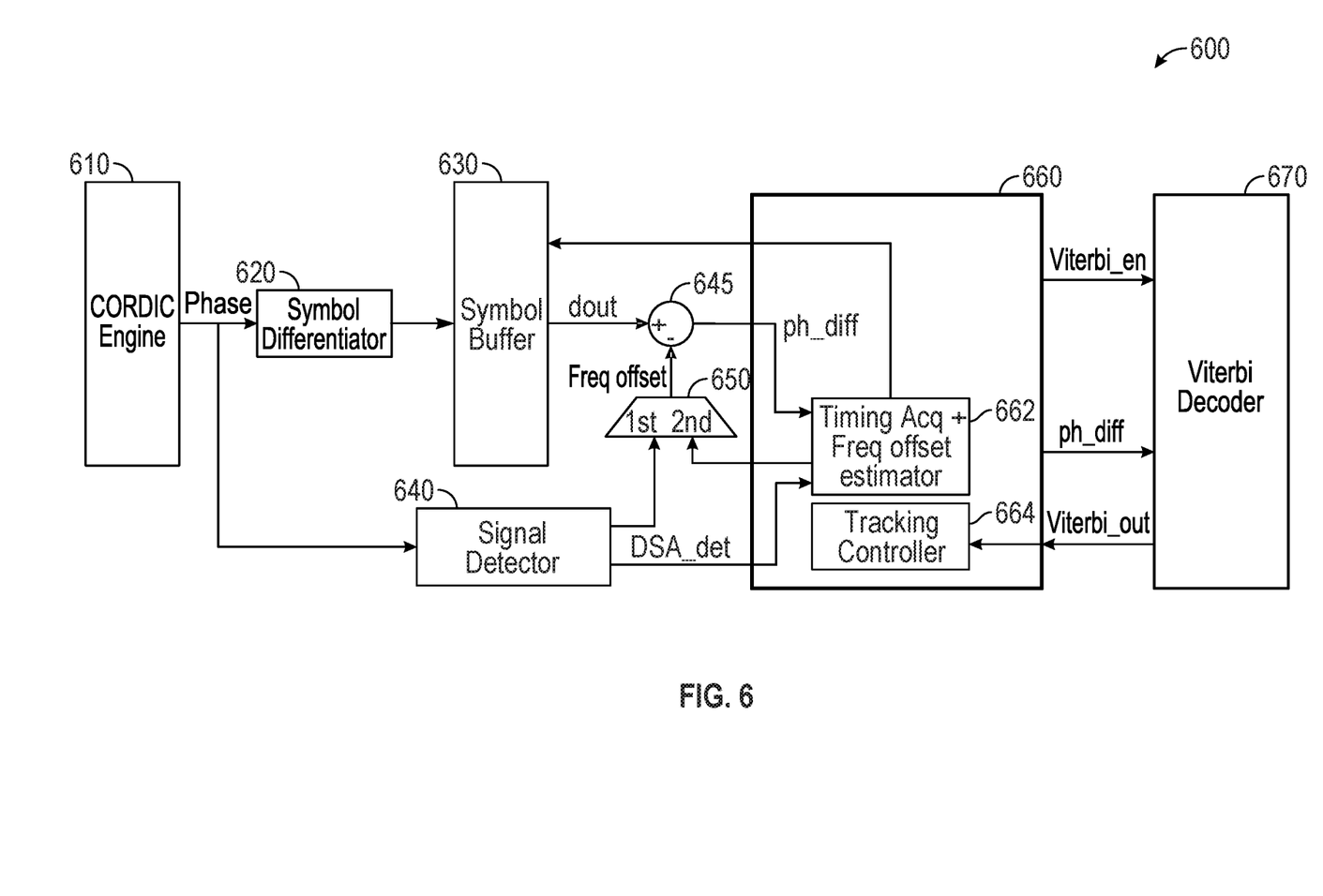
FIG. 6 is a block diagram of a demodulator in accordance with an embodiment.

Referring now to FIG. 6, shown is a block diagram of a demodulator in accordance with an embodiment. More specifically, FIG. 6 shows a block diagram of a Viterbi demodulator 600 that uses Ksi values as determined herein. As seen, demodulator 600 receives incoming Cartesian inputs (output from a channel filter, not shown in FIG. 6) in a CORDIC engine 610 and generates phase signals, provided to a symbol differentiator 620 and a signal detector 640, which may be implemented as a digital signal detector. Symbol differentiator 620 may perform phase differentiation over a symbol interval and a given oversampling rate and provide phase-differentiated symbols for storage in a symbol buffer 630, which may be implemented as a circular buffer stored in a random access memory.

When an incoming signal is detected by signal detector 640, symbol timing may be recovered using a cost function engine 660, implemented with a timing acquisition and frequency offset estimator 662.

When the symbol timing is recovered, differentiated samples are read out of symbol buffer 630, and passed to a Viterbi decoder 670, which extracts symbol values. Here it may be determined whether a synchronization word is active, at which point a remainder of a packet may be demodulated. If the synchronization word is not detected, demodulator 600 restarts by searching for signal arrival.

Note that frequency offset may be compensated in a summer 645 based on a coarse frequency offset estimation provided by signal detector 640 or a refined estimate from estimator 662. Cost function engine 660 also may be configured to track frequency offset timing errors. Decoded symbols output by Viterbi decoder 670 also may be provided to a tracking controller 664 to perform control operations.

Figure 7:
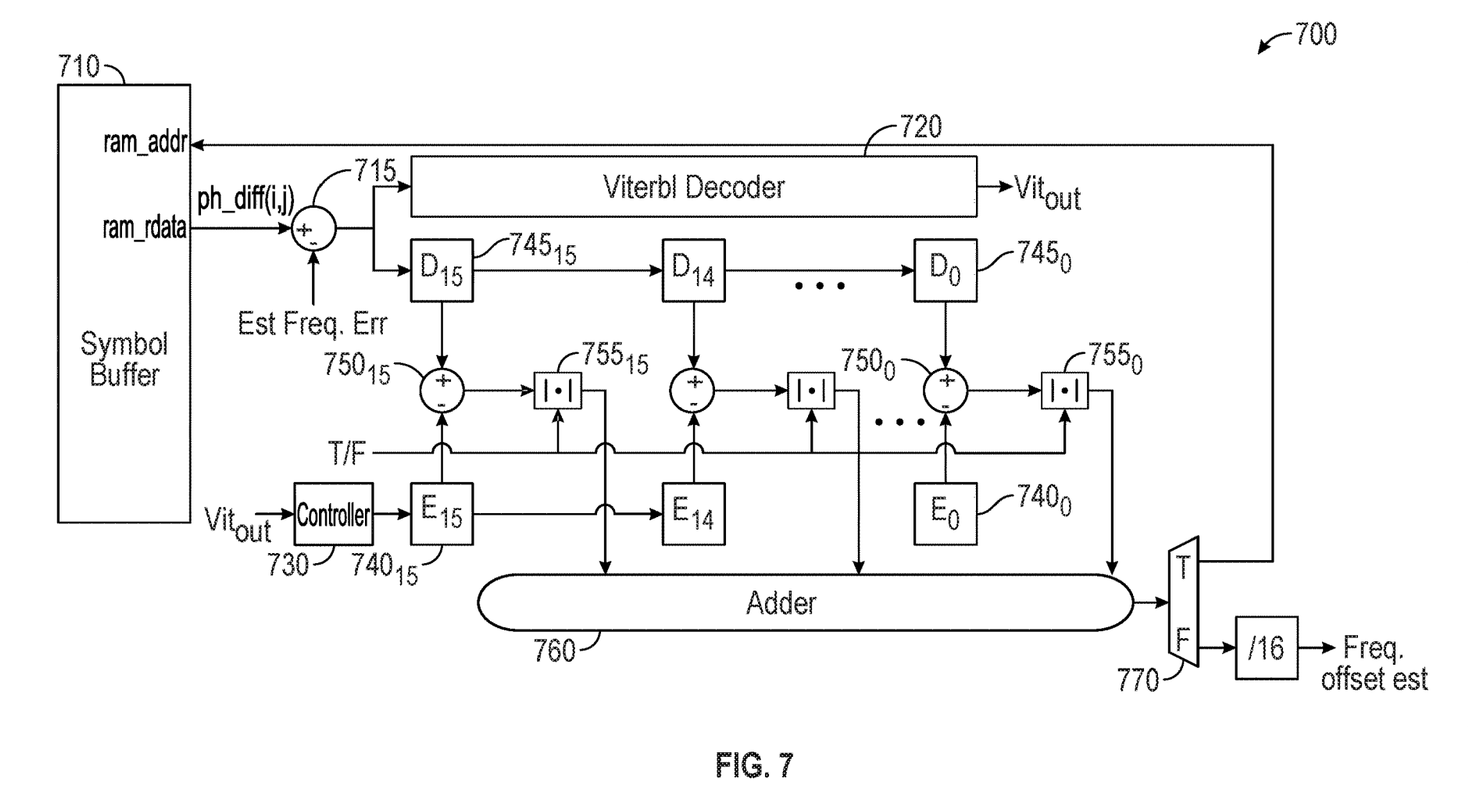
FIG. 7 is a block diagram of further details of a demodulator in accordance with an embodiment.

Referring now to FIG. 7, shown is more detailed arrangement of a cost function engine in accordance with an embodiment. As shown in FIG. 7, cost function engine 700 receives incoming phase differentiated symbols from a symbol buffer 710. After frequency offset correction in a summer 715, corresponding symbols are provided to Viterbi decoder 720 and to a plurality of registers $745_{15-0}$. In turn, these values may be compared in corresponding comparators $750_{15-0}$ to expected phase difference values, namely Ksi values, that are output by Ksi controller 730 in turn coupled to a plurality of Ksi registers $740_{15-0}$.

The difference between actual received data values and expected values may be set to an absolute value based on control of corresponding absolute value operators 755 (e.g., based on whether operation is in a tracking mode or a frequency acquisition mode). In turn, the resulting differences are provided to an adder 760 to perform correlation over a correlation window of 16 bits. In other embodiments, this programmable window may be another size such as 32 bits. In turn, the correlated output is provided to a multiplexer 770 to update addresses within symbol buffer 710 in tracking mode, and instead in frequency acquisition mode to provide a frequency offset estimation to frequency offset corrector 715.

Figure 8:
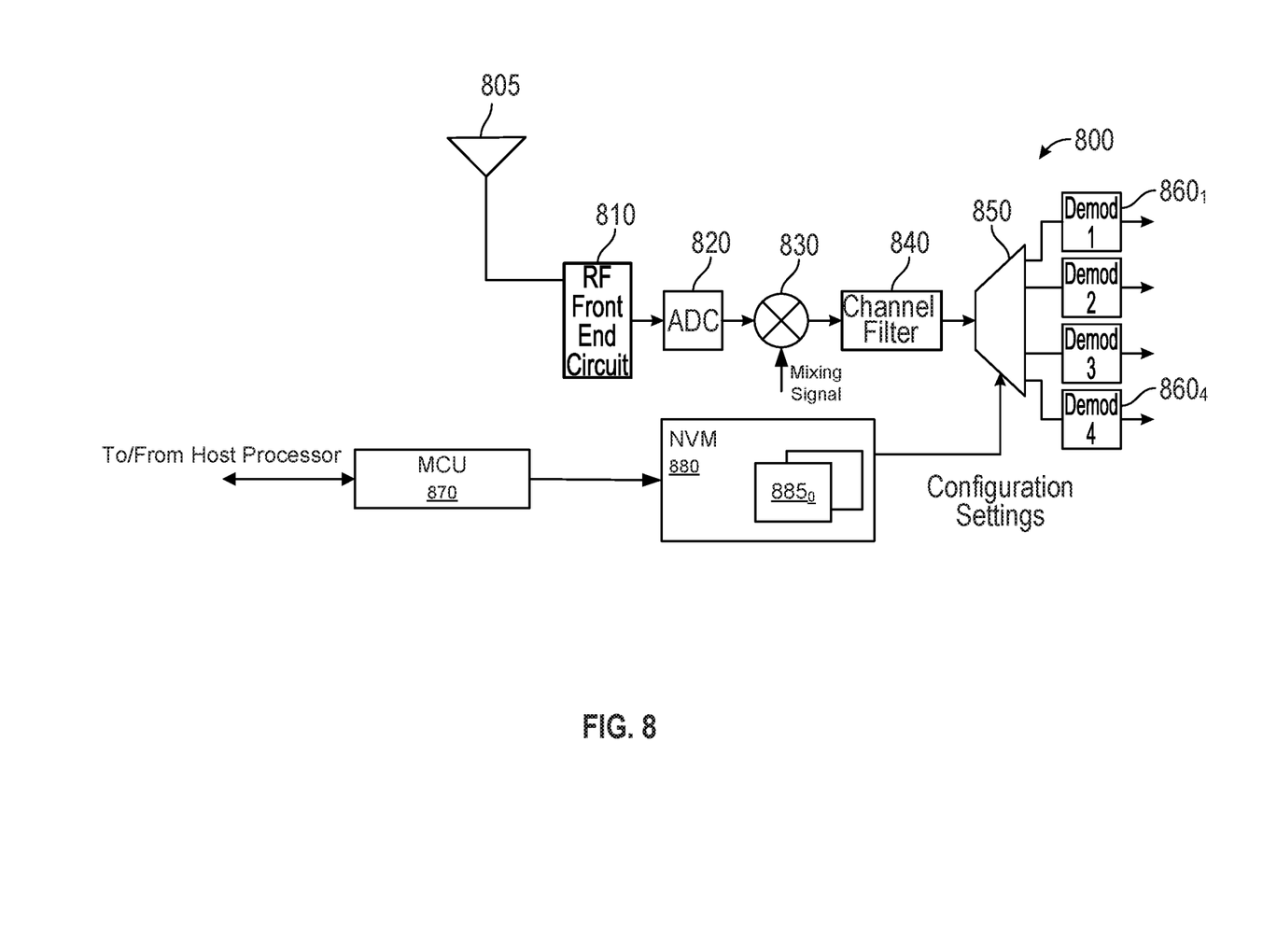
FIG. 8 is a block diagram of a wireless device in accordance with an embodiment.

Referring now to FIG. 8, shown is a block diagram of a wireless device in accordance with an embodiment. As shown in FIG. 8, wireless device 800 may be any type of device that can at least receive RF signals. In some cases, the device may be an IoT device that has both receive and transmit capabilities. For ease of discussion only a receiver portion of wireless device 800 is shown.

In the high level shown in FIG. 8, wireless device 800 receives incoming RF signals via an antenna 805. In turn, the incoming RF signals are provided to an RF front end circuit 810. RF front end circuit 810 may perform various processing such as gain control, e.g., using a low noise amplifier, additional gain stages, filtering, downconversion via mixer, and so forth. In turn, the processed signals are provided to a digitizer, implemented in the embodiment of FIG. 8 as an ADC 820, for digitization. In turn, digitized signals are provided to a mixer 830, which downconverts the signals to a lower frequency, e.g., an intermediate frequency baseband or so forth, using a mixing signal (which may be received from a frequency synthesizer, phase lock loop or so forth (not shown for ease of illustration in FIG. 8)). Although not shown in the high level of FIG. 8, understand that various additional components may be present in a receive path, such as one or more decimators, a DC filter, an IQ calibration circuit or so forth.

Still with reference to FIG. 8, after downconversion to a lower frequency, the resulting signals are provided to a channel filter 840 for channel filterization. After filtering, these signals are provided to a selection circuit 850 which may be implemented as a multiplexer to selectively provide the signals to one of multiple demodulators $860_1$-$860_4$.

As shown in FIG. 8, selection circuit 850 may be controlled based on one or more configuration settings stored in a non-volatile memory 880. More specifically, as described herein these configuration settings may be present in one of multiple configuration files $885_{0-n}$ stored in non-volatile memory 880. And as described herein, this configuration file may be generated by a hardware configurator based on minimal user input parameters. As further shown in FIG. 8, a microcontroller unit (MCU) 870 may couple to a host processor of wireless device 800. Based on control information from this host processor, which may include information for a desired wireless communication protocol, MCU 870 in turn may select an appropriate one of multiple configuration files 885 within non-volatile memory 880 for use in configuring selection circuit 850. In addition, various other configuration settings of the selected configuration file may be used for purposes of providing configuration values to configuration registers, including providing Ksi values for use in operating a Viterbi demodulator as described herein. Additional configuration settings may be used to provide control signals for additional circuitry of wireless device 800 and so forth. Understand while shown at this high level in the embodiment of FIG. 8, many variations and alternatives are possible.

Figure 9:
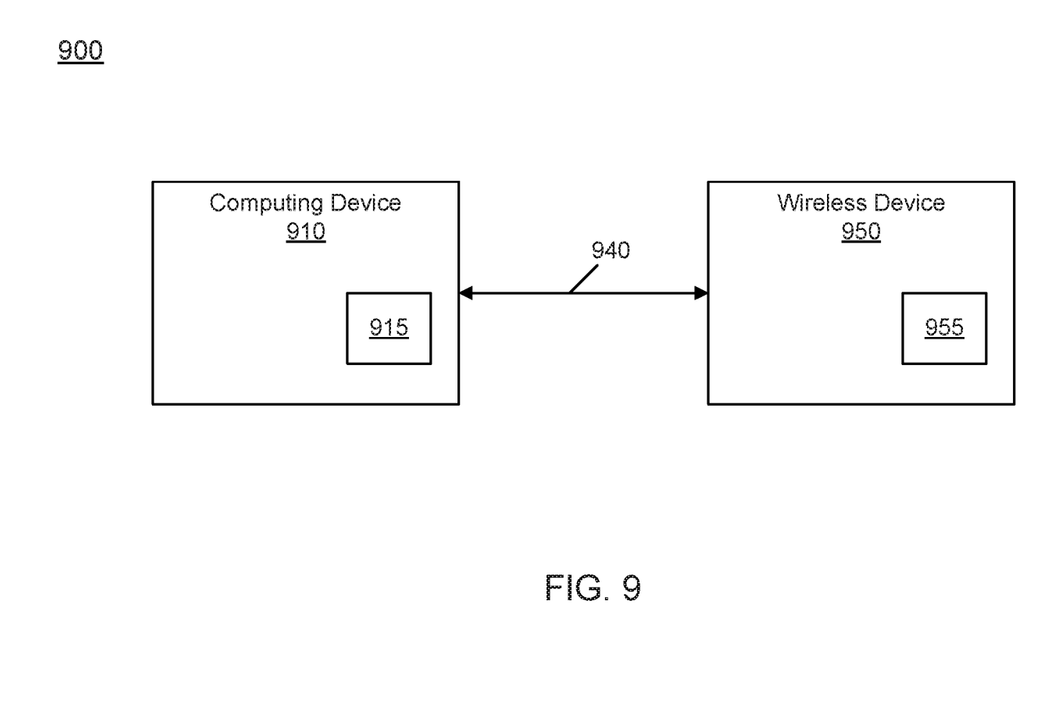
FIG. 9 is a block diagram of a configuration environment in accordance with an embodiment.

Referring now to FIG. 9, shown is a block diagram of a configuration environment in accordance with an embodiment. As shown in FIG. 9, configuration environment 900 includes a computing device 910. Computing device 910 may be any type of computer system, ranging from a laptop or desktop computer, a server computer or even a smaller device such as a tablet or smartphone having a hardware configurator as described herein. Understand that an end user may use computing device 910 to generate a configuration file for a wireless device, Computing device 910 may include various circuitry including one or more processors, communication buses, memory, display and other input/output circuitry, including a user input mechanism such as a touch panel, keypad or so forth and other circuitry. Understand that with embodiments herein, an included memory and/or mass storage device (generally illustrated at item 915) may include instructions stored in a non-transitory storage medium for execution by the hardware configurator. In embodiments, the one or more processors may execute such instructions to implement this hardware configurator. In other cases, dedicated hardware circuitry may be provided to implement the hardware configurator.

In any event, in execution, the hardware configurator may cause a series of graphical user interfaces (GUIs) to be displayed on a display device that allows the end user to select and/or input user input parameters for a variety of different features. As described above, the GUIs may provide for user input or selection of a variety of different user-defined parameters. Such parameters may include operational frequency, e.g., in the form of a base channel frequency and a channel spacing, crystal frequency information including a crystal frequency and accuracy. In addition, the GUIs may provide for input of modem information, including modulation type, bit rate, deviation, baud rate tolerance, and shaping filter information (e.g., of different types, including Gaussian, raised cosine or so forth). The GUIs may further provide for input of packet-based information including general frame information, frame length information (fixed and variable length frames), frame type, CRC information and so forth. In addition, frame contents, including preamble, syncword and payload information can also be provided. The GUIs may further provide for input of symbol coding information and channel coding information.

In some embodiments, the GUIs may further provide for advanced information that an expert user may input, while instead a novice user does not provide anything for these inputs and the hardware configurator may determine such information. Note that this advanced information input allows an experienced user to fine tune certain parameters. In addition, the configurator may allow an end user to overwrite certain determined parameters in a manner that allows downstream calculations to use the overwritten values.

In turn, the hardware configurator, based on this information can determine the wide number of configuration settings for a wireless device 950. After the configuration file is finalized and stored within computing device 910, it may be provided to wireless device 950 for storage in an included non-volatile memory 955. In different implementations, this configuration file may be provided to wireless device 950 via a wired or wireless interconnect 940. More specifically, the configurator may couple to wireless device 950, e.g., via a USB or other interface. For example an $I^2C$, SPI, or another any protocol can be used for transmitting data. In some cases, the configuration file may be directly communicated to wireless device 950. This configuration file can also be updated wirelessly. For example, wireless device 950 can receive an update over the air and the rewrite non-volatile memory 950 with the new data. In other cases, once a customer has a specific image they could "image" it on their chips at production time or later, with multiple chips being imaged at once in a factory setting. Understand while shown at this high level in the embodiment of FIG. 9, many variations and alternatives are possible.

Note that embodiments may be used additionally by developers, debug engineers, validation and application engineers and so forth to generate configuration settings for use in performing simulations of a wireless device design. In addition, these expert users may further perform program design, debug and validation efforts on prototype silicon devices as well as testing manufactured integrated circuits. In this way, a developer may continue to further develop a device's design when final configuration settings can be determined, even before a calculation is defined. For example, instead of fixing thresholds for packet detection, embodiments enable a dynamic, relative threshold determination in which a receiver can identify relative strength of peak signals when a packet is detected and floor signals in the absence of packet detection, and dynamically set a threshold at a scaling value of the peak signal (e.g., according to a configuration setting for the scaling factor).

Embodiments thus allow users to abstract fine-grained details of a wireless device's configuration by enabling the user to provide, via a user interface, only a limited number of user-defined parameters from which a hardware configurator can develop all remaining configuration settings for the device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    receiving, in a configurator for a wireless receiver, a plurality of user-defined parameters for configuring the wireless receiver for wireless communication, the user-defined parameters including pulse shaping information of a pulse shaper of a wireless transmitter to be in communication with the wireless receiver and channel filter information of a channel filter of the wireless receiver;
    generating a plurality of frequency signals based on a corresponding plurality of predetermined bit sequences and at least two of the plurality of user-defined parameters including the pulse shaping information and the channel filter information;
    setting a first nominal symbol value based at least in part on an oversampling rate for a demodulator of the wireless receiver; and
    configuring the wireless receiver with the first nominal symbol value to cause the demodulator of the wireless receiver to operate using the first nominal symbol value.

2. The method of claim 1, further comprising:
    setting the first nominal symbol value to a predetermined maximum value when a modulation index for the wireless receiver is within a first range; and
    otherwise setting the first nominal symbol value to a calculated nominal symbol value.

3. The method of claim 2, further comprising setting a second nominal symbol value based at least in part on a second frequency signal of the plurality of frequency signals.

4. The method of claim 3, further comprising scaling the second frequency signal by a scaled value, the scaled value based on a first frequency signal and the first nominal symbol value.

5. The method of claim 3, wherein setting the second nominal symbol value comprises sampling the second frequency signal at a plurality of phases and calculating a candidate second nominal symbol value using the second frequency signal at each of the plurality of phases.

6. The method of claim 5, further comprising setting the second nominal symbol value to a maximum candidate second nominal symbol value.

7. The method of claim 3, further comprising:
    setting a third nominal symbol value based at least in part on a third frequency signal of the plurality of frequency signals, comprising:
        sampling the third frequency signal at a plurality of phases and calculating a candidate third nominal symbol value using the third frequency signal at each of the plurality of phases; and
        setting the third nominal symbol value to a minimum candidate third nominal symbol value.

8. The method of claim 7, wherein the first nominal symbol value is for a first bit sequence having a first predetermined bit pattern, the second nominal symbol value is for a second bit sequence having a second predetermined bit pattern and the third nominal symbol value is for a third bit sequence having a third predetermined bit pattern.

9. The method of claim 1, wherein configuring the wireless receiver comprises communicating the first nominal symbol value from the configurator to a non-volatile storage of the wireless receiver for storage in the non-volatile storage.

10. An apparatus comprising:
    a radio frequency (RF) front end circuit to receive and process an RF signal having a plurality of symbols including symbol data;
    a mixer to downconvert the RF signal to a second frequency signal having the plurality of symbols including the symbol data;
    a digitizer to digitize the second frequency signal having the plurality of symbols including the symbol data;
    a symbol buffer to store the symbol data from the plurality of symbols; and
    a cost function engine coupled to the symbol buffer, the cost function engine comprising:
        a storage to store a plurality of nominal symbol values each associated with a predetermined bit pattern, wherein the plurality of nominal symbol values are populated into the storage from a configuration file, the configuration file generated by a hardware configurator in response to one or more user input parameters;
        a first plurality of registers to receive and pass a sample of the symbol data;
        a second plurality of registers to receive and pass a selected one of the plurality of nominal symbol values;
        a comparator circuit to compare the sample of the symbol data to the selected nominal symbol value and to output a comparison result; and
        an adder to sum the comparison result and to output a sum value.

11. The apparatus of claim 10, further comprising a Viterbi decoder coupled to the cost function engine, wherein the Viterbi decoder is to decode the symbol data based at least in part on the sum value.

12. The apparatus of claim 10, further comprising a non-volatile memory to store the configuration file.

13. The apparatus of claim 10, further comprising a CORDIC engine to receive the symbol data and store phase-differentiated symbols into the symbol buffer.

14. The apparatus of claim 13, wherein the plurality of nominal symbol values comprises expected phase difference values.

15. The apparatus of claim 13, wherein the adder is to perform a correlation over a programmable window size.

16. At least one non-transitory computer readable storage medium comprising instructions that when executed by a processor enable a system to perform a method comprising:
    receiving, in a configurator for a wireless receiver, a plurality of user-defined parameters for configuring the wireless receiver for wireless communication, the user-defined parameters including pulse shaping information of a pulse shaper of a wireless transmitter to be in communication with the wireless receiver and channel filter information of a channel filter of the wireless receiver;
    generating a plurality of frequency signals based on a corresponding plurality of predetermined bit sequences and at least two of the plurality of user-defined parameters including the pulse shaping information and the channel filter information;
    setting a first nominal symbol value based at least in part on an oversampling rate for a demodulator of the wireless receiver; and
    configuring the wireless receiver with the first nominal symbol value to cause the demodulator of the wireless receiver to operate using the first nominal symbol value.

17. The at least one non-transitory computer readable storage medium of claim 16, wherein the method further comprises:
    setting the first nominal symbol value to a predetermined maximum value when a modulation index for the wireless receiver is within a first range; and
    otherwise setting the first nominal symbol value to a calculated nominal symbol value.

18. The at least one non-transitory computer readable storage medium of claim 17, wherein the method further comprises setting a second nominal symbol value based at least in part on a second frequency signal of the plurality of frequency signals.

19. The at least one non-transitory computer readable storage medium of claim 18, wherein the method further comprises setting a third nominal symbol value based at least in part on a third frequency signal of the plurality of frequency signals, comprising:
    sampling the third frequency signal at a plurality of phases and calculating a candidate third nominal symbol value using the third frequency signal at each of the plurality of phases; and
    setting the third nominal symbol value to a minimum candidate third nominal symbol value.

20. The at least one non-transitory computer readable storage medium of claim 19, wherein the method further comprises setting the first nominal symbol value for a first bit sequence having a first predetermined bit pattern, setting the second nominal symbol value for a second bit sequence having a second predetermined bit pattern and setting the third nominal symbol value for a third bit sequence having a third predetermined bit pattern.

\* \* \* \* \*